S. J. SILL.
MACHINE FOR CUTTING FABRIC.
APPLICATION FILED JAN. 8, 1908.
Patented Jan. 19, 1909.
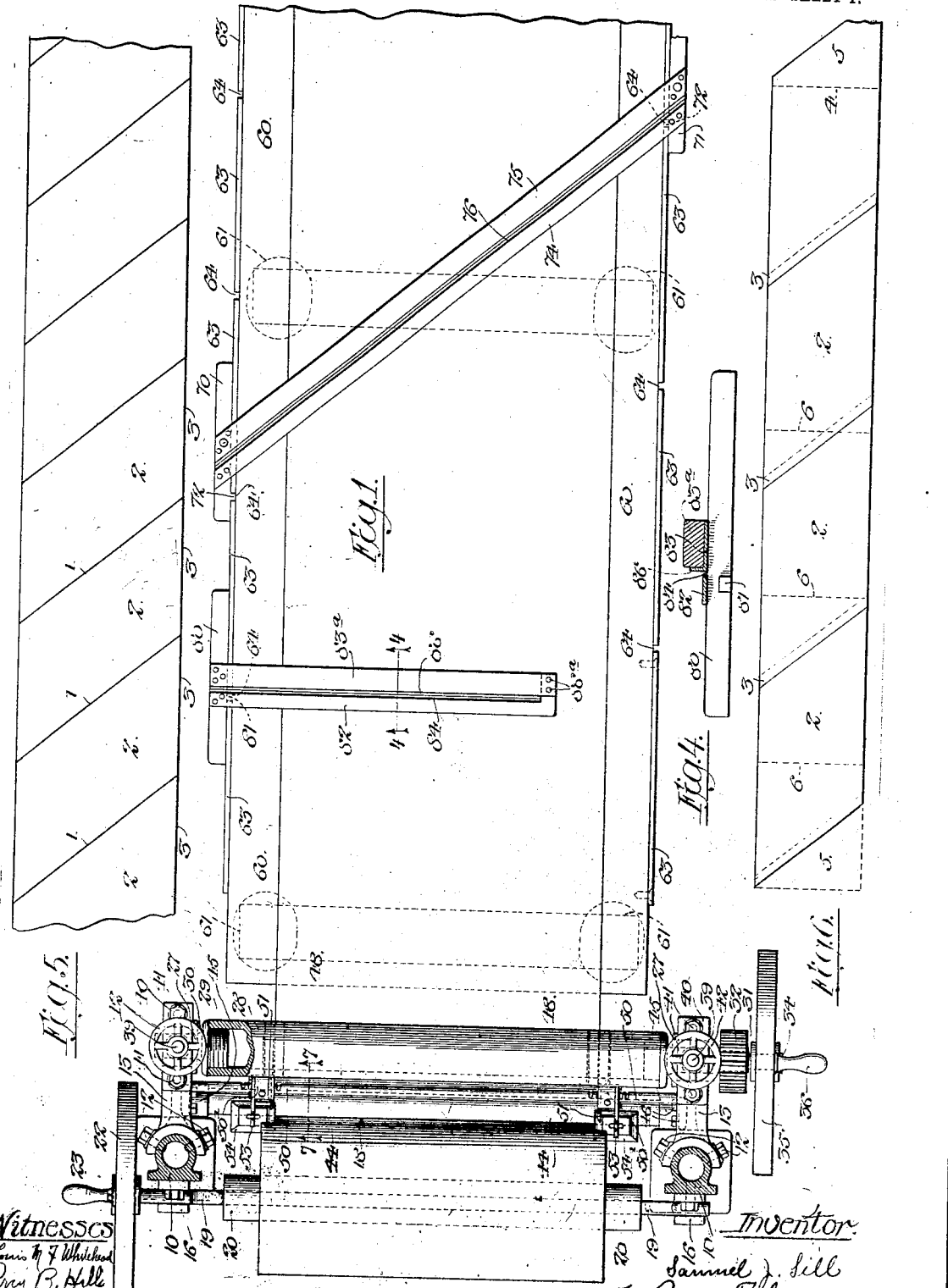
Witnesses
Inventor
Samuel J. Sill
by Prince & Fisher Attys

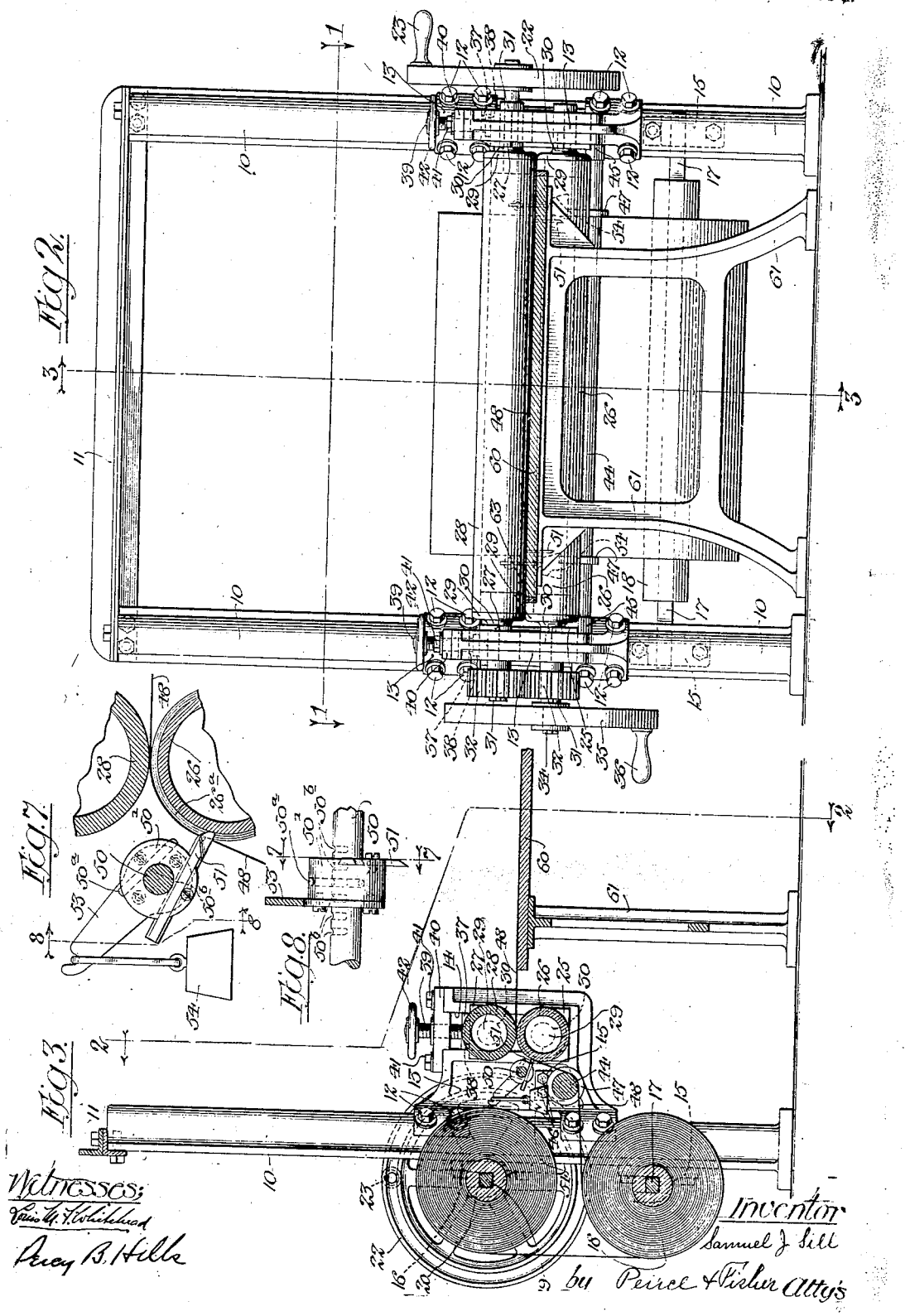

UNITED STATES PATENT OFFICE.

SAMUEL J. SILL, OF BUFFALO, NEW YORK, ASSIGNOR OF ONE-HALF TO HERBERT H. HEWITT, OF BUFFALO, NEW YORK.

MACHINE FOR CUTTING FABRIC.

No. 910,325.

Specification of Letters Patent.

Patented Jan. 19, 1909.

Application filed January 8, 1908. Serial No. 409,766.

*To all whom it may concern:*

Be it known that I, SAMUEL J. SILL, a citizen of the United States, residing at Buffalo, county of Erie, and State of New York, have invented certain new and useful Improvements in Machines for Cutting Fabric, of which I do declare the following to be a full, clear, and exact description, reference being had to the accompanying drawings, forming part of this specification.

The present invention has for its object more especially to provide an improved machine for the bias cutting of frictioned duck that is used in the manufacture of rubber hose and the invention consists in the features of novelty hereinafter described, illustrated in the accompanying drawings and particularly pointed out in the claims at the end of this specification.

In the drawings, Figure 1 is a plan view of the improved machine, with parts shown in section on line 1—1 of Fig. 2. Fig. 2 is a vertical section on line 2—2 of Fig. 3. Fig. 3 is a vertical section on line 3—3 of Fig. 2. Fig. 4 is a detail section on line 4—4 of Fig. 1. Figs. 5 and 6 are detail views illustrating the manner in which the fabric is cut. Fig. 7 is a detail section on lines 7—7 of Figs. 1 and 8. Fig. 8 is a detail section on line 8—8 of Fig. 7.

In the manufacture of rubber hose, it is customary to "friction" a web of duck and after trimming its edges to cut the web on the bias into comparatively short lengths or sections. These bias sections of duck are then joined end to end, the edges of the sections being overlapped and stuck together until a long strip of bias material is formed. The strip of bias material thus formed is afterwards cut up into short sections of the proper length depending upon the length of hose to be formed. Thus for example, in manufacturing sections of hose for railway air brake systems, the long strip of bias duck will be cut into sections about 22 inches long and these sections will thereafter be wound upon suitable mandrels and will be lined and covered with rubber and after being suitably capped or sealed at the ends will be subjected to the vulcanizing operation.

My present invention provides a simple and most efficient machine whereby the frictioned duck may be cut upon the bias and into short lengths or sections from which the hose sections may be formed.

In Fig. 5 of the drawings, there is shown a length of frictioned duck that has been cut upon the line 1 into the short lengths or sections 2, and in Fig. 6 is shown a bias strip that is formed by joining the sections 2 together, this joining of the sections being accomplished by overlapping the ends 3 of the sections as shown. When the strip shown in Fig. 6 has been thus formed, the ends of the strip will be squared by cutting the strip adjacent one end upon the line 4 and by taking the section 5 thus removed from the strip and joining it to the opposite end of the strip as indicated in dotted lines. The bias strip thus formed will subsequently be cut upon the dotted lines 6 into proper lengths (say 22 inches long) to form the sections of the hose.

10 designates the main posts or standards of the machine, the base plates of which will be rigidly secured to a suitable foundation and, as shown, the tops of the posts or standards are united together by a transverse bar 11. Preferably, the posts 10 have their front portions of tubular form, as shown in Fig. 1, and to these posts are bolted as at 12 the brackets 13 that are formed with the guide-ways 14 adapted to receive the bearings of pressure rolls to be presently described. Upon the back portions of the posts 10 are bolted the lower and upper hook-shaped brackets 15 and 16, the lower brackets 15 serving as bearings for releasably engaging the journal bar 17 of a reel or drum 18 that will carry the roll of frictioned duck to be cut, and will carry also the facing cloth that covers the frictioned duck and is wound therewith in alternate layers upon the roll. The brackets 16 serve as bearings for releasably supporting the journal bar or axle 19 of a reel or drum 20 onto which will be wound the cotton cloth or facing that is used to cover the web of frictioned duck and prevent its sticking together while on the reel or drum 18. To one end of the axle 19 is connected a hand-wheel 22 having a handle 23 whereby it may be turned to wind the cotton cloth onto the drum or reel 20. The body portions of the axles 17 and 19 are preferably squared to fit square openings in the reels or drums 18 and 20 into and from which the axles can be freely inserted and withdrawn.

Within the guide-ways 14 of the brackets 12 are mounted the lower bearing blocks 25 in which rest the journals of the lower pressure roll 26 and within these guideways 14 are mounted the bearing blocks 27 for the upper pressure roll 28. The upper and lower bearing blocks are formed with guide flanges to hold them in position within the guide-ways 14. Preferably, the pressure rolls 26 and 28 are hollow cylinders having interiorly threaded ends (see Fig. 1) to receive the correspondingly threaded portions of caps 29, the reduced portions 30 of these caps forming the journals of the rolls. Each of the caps 29 at one side of the machine is formed with a reduced portion 31 on which will be keyed a gear wheel 32, these gear wheels being of like diameter and meshing together so as to insure the uniform revolution of the upper and lower pressure rolls. One of the caps 29 is also provided with a reduced extension 34 to which will be keyed a hand-wheel 35 having a handle 36, whereby revolution may be imparted to the rolls 26 and 28. To the top of each of the bearing blocks 27 is bolted a lifting plate 37 that is formed upon its underside with a cavity to receive the head 38 of an adjusting screw 39 that passes through a hole in the lifting plate 37 and through a threaded opening in a cap-plate 40 that is bolted as at 41 upon the top of each of the brackets 13. Each of the adjusting screws 39 is provided with a hand-wheel 42 and by the turning of these hand wheels the upper pressure roll 28 may be raised and lowered.

In front of the lower pressure roll 26 is placed an idler roll 44, the ends of which are shown as journaled in bearings 45 that are bolted as at 46 to the inner sides of the brackets 13 and upon this idler roll 44 are fixed collars or washers 47 that serve to guide the strip of duck 48 as it passes from off the drum or reel 18.

Above the idler roll 44 and suitably journaled in bearings at the inner sides of the brackets 13 is mounted the knife bar 50 to which are secured the trimming knives 51. The ends of these knives 51 rest against the periphery of the lower pressure roll 26 and preferably extend within groves 26ᵃ therein, (see Fig. 7), and these knives 51 serve to trim the edges of the duck as it passes into the bite of the pressure rolls 26 and 28. The knives are preferably fixed to holders 50' that are adjustably held on the bar 50 for different widths of duck by pins 50ᵃ, arranged to engage grooves 50ᵇ in the bar 50. Each knife holder 50' is provided with an arm 53 from which is suspended a weight 54 that serves to hold the ends of the knives snugly against the periphery of the lower pressure roll 26.

From the description of the parts thus far defined, it will be seen that by turning the hand-wheel 35 the web of frictioned duck 48 will be drawn under the guide from the roll 18 will be drawn under the guide roll 44 and between the flanges thereof and then through the pressure rolls 26 and 28 and, as the duck thus passes through the pressure rolls, the knives 51 will serve to accurately trim the edges of the web. At the same time by turning the hand-wheel 22, the cotton web or sheet with which the duck is faced will be wound upon the reel or drum 20.

As the frictioned duck issues from the pressure rolls 26 and 28, it is received upon a table or bed 60 that is mounted upon suitable legs 61 arranged at convenient distances apart. The top surface of the table 60 should be faced with a sheet of soft metal to prevent the dulling of the knives in the cutting operation. As shown, each of the edges of the table 60 has bolted thereto metal bars 63, the ends of these bars being separated to form the spaces 64 for the purpose to be presently stated.

To enable the bias cutting of the web of duck to be accurately effected, I have provided for use in connection with the cutting table the improved knife guiding mechanism next to be described. As shown this mechanism comprises end bars 70 and 71, the inner edges of which are adapted to bear against the bars 63 that are secured to the edges of the table 60 and from the inner edges of each of the end bars 70 and 71 projects a stud 72 adapted to enter the spaces 64 between the bars 63. To the upper faces of the end bars 70 and 71 are secured the guide bars 74 and 75 that are separated a sufficient distance to form the slot 76 through which the blade of the operator's knife will pass. Preferably, the bar 75 is an angle-bar, the upturned portion of which affords a broader bearing for the blade of the operator's knife. It will thus be seen that when the lugs 72 of the end bars 70 and 71 are placed within the spaces 64 at the side edges of the table 60, the bars 74 and 75 will extend diagonally across the table and over the web of frictioned duck thereon, as shown in Fig. 1, of the drawings, and the operators, one at each side of the table (if the width of the web be sufficient to require two operators) will draw their hand knives along the slot 76 and thus accurately sever the web of frictioned duck upon a diagonal line. The operators will then lift the end bars 70 and 71 and insert their lug 72 in the next succeeding spaces 64 and repeat the cutting operation until a sufficient number of sections have been cut to form a long bias strip such as is shown in Fig. 5 of the drawings.

When a proper number of bias sections have thus been cut from the web of frictioned duck, these sections will be laid end to end with their ends overlapping and stuck together to form the upper strip shown in Fig. 6 of the drawings. In order to give square ends to this bias strip, the operator will square one end of the strip by cutting therefrom the triangular shaped piece 5 shown in Fig. 6, and will apply this triangular shaped piece to the opposite end of the strip, as shown. To secure the accurate cutting of the triangular piece from the end of the bias strip, I have provided the straight edge next to be described. This straight edge consists of an end bar 80 from the inner edge of which projects a stud 81 adapted to enter one of the spaces 64 between the bars 63 at the edge of the table 60 and to the upper face of the end bar 80 are secured the guide bars 82 and 83 that are separated a sufficient distance to form the slot 84 along which the blade of the operator's knife may be passed. Preferably, the bar 83 is formed with a raised flange 86 (see Fig. 4) to better guide the operator's knife. The outer end of this bar 82 has an angular portion that is secured as at 86 to the end of the bar 83. By placing the lug or stud 81 within one of the spaces 64, the straight edge will be accurately positioned and by passing his knife along the groove or guide-way 86, the operator can squarely sever the end portion of the bias strip, and cut the same into sections, as indicated by the dotted lines 6 in Fig. 6. For convenience in handling the guide, a wooden bar 83ª is preferably fixed to the angle bar 83 and a similar wooden bar may be secured to the guide employed for bias cutting.

It is obvious that the details of structure could be varied without departure from the essentials of the invention.

Having thus described my invention, what I claim as new and desire to secure by Letters Patent is:—

1. In a machine for cutting fabric, the combination of a roll for holding the fabric to be cut, a roll for winding up the facing fabric, a pair of pressure rolls for drawing off the body fabric and a table whereon the body fabric is received as it issues from the pressure rolls.

2. In a machine for cutting fabric, the combination of a roll for holding the body fabric to be cut and the facing fabric wound therewith, a pair of pressure rolls for drawing off the body fabric, a roll located in advance of said pressure rolls for winding up the facing fabric and independent means for imparting rotation to said pressure rolls and to said roll whereon the facing fabric is wound.

3. In a machine for cutting fabric, the combination of suitable standards or supports, a roll for holding the body fabric to be cut and the facing fabric, a roll for winding up the facing fabric, brackets at one side of said standards or supports for detachably holding the journals of said rolls, a pair of pressure rolls at the opposite side of said standards or supports for drawing off the body fabric, said roll for winding up the facing fabric being located in advance of said pressure rolls and independent means for imparting rotation to said pressure rolls and said roll for winding up the facing fabric.

4. In a machine for cutting fabric, the combination of a roll for holding the body fabric to be cut and the facing fabric, a pair of pressure rolls for drawing off the body fabric, a roll located in advance of said pressure rolls for winding up the facing fabric, independent means for imparting rotation to said pressure rolls and to said roll for winding up the facing fabric, and knives for trimming the edges of the body fabric after the facing fabric has been removed therefrom and as said body fabric is drawn through the pressure rolls.

5. In a machine for cutting fabric, the combination of a roll for holding the fabric to be cut, a roll for winding up the facing fabric, an idler roll provided with collars or washers for guiding the body fabric, a pair of pressure rolls for drawing off the body fabric and knives for trimming the edges of the body fabric as it passes through the pressure rolls.

6. In a machine for cutting fabric, the combination of a roll for holding the body fabric to be cut and the facing fabric, a pair of pressure rolls for drawing off the body fabric, a roll for winding up the facing fabric located in advance of said pressure rolls, independent means for imparting rotation to said pressure rolls and to said roll for winding up the facing fabric, knives for trimming the edges of the body fabric after the facing fabric has been separated therefrom, and pressure mechanism for holding one of said trimming knives against one of the pressure rolls.

7. In a machine for cutting fabric, the combination of a roll for holding the fabric to be cut, a pair of pressure rolls for drawing off the body fabric, an idler roll provided with collars or sleeves for guiding the body fabric, a knife bar provided with knives for trimming the edges of the body fabric and a weight attached to said knife bar for holding said knives against one of the pressure rolls.

8. Mechanism for cutting fabric, comprising a table whereon the fabric to be cut will be spread, and a knife guide provided at one at least of its ends with an end bar, and lug and groove interlocking means whereby the knife guide may be held in different positions and against movement lengthwise of the table.

9. Mechanism for cutting fabric, comprising a table whereon the fabric to be cut will be spread and a knife-guide having end bars and having guide bars spaced apart and extending between said end bars to form a guideway for the knife; the edges of said table and the end bars of said knife guide being provided with interlocking lugs and grooves whereby the knife-guide may be held in different positions and against movement lengthwise of the table.

10. Mechanism for cutting fabric comprising a table provided at its edges with guide grooves and a knife guide having end bars provided with lugs to enter the grooves at the edges of the table and having guide bars connecting said end bars and spaced apart to form a guide-way for the knife.

SAMUEL J. SILL.

Witnesses:
HARRY L. CLAPP,
KATHARINE GERLACH.